(No Model.)
R. HILL.
SPARK ARRESTER.
No. 260,753. Patented July 11, 1882.
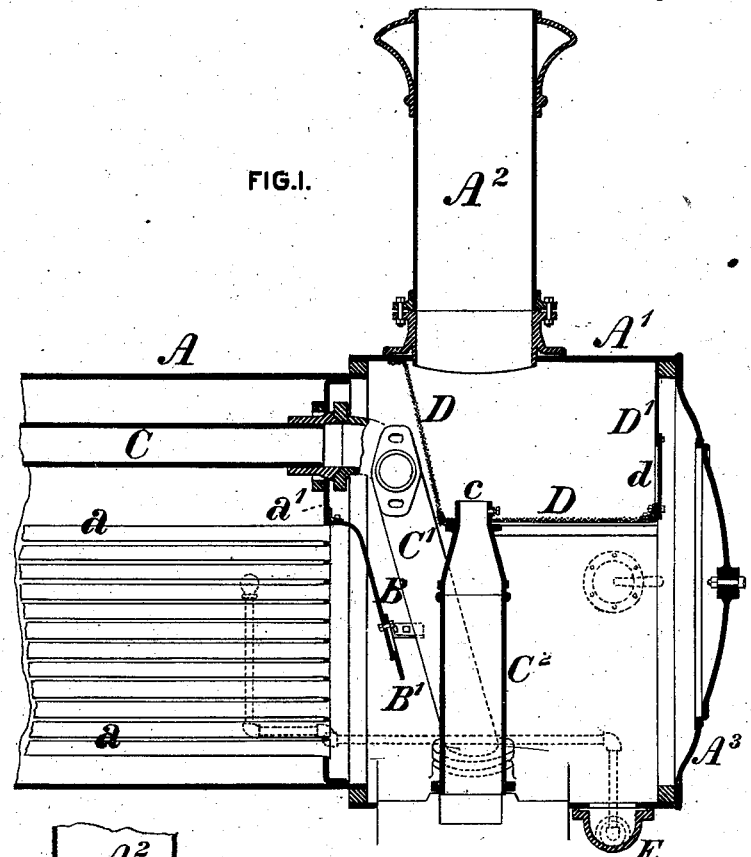
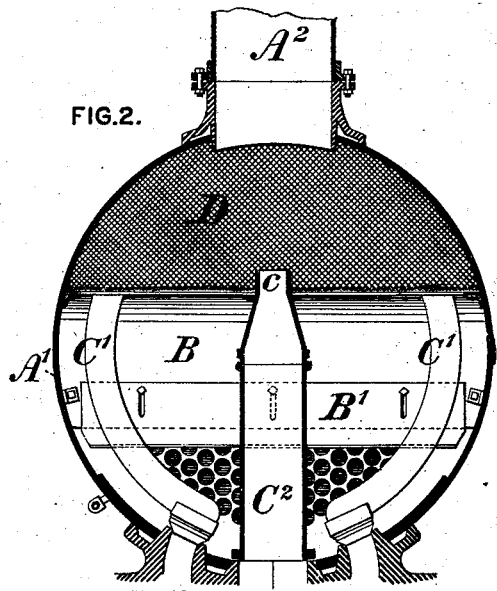
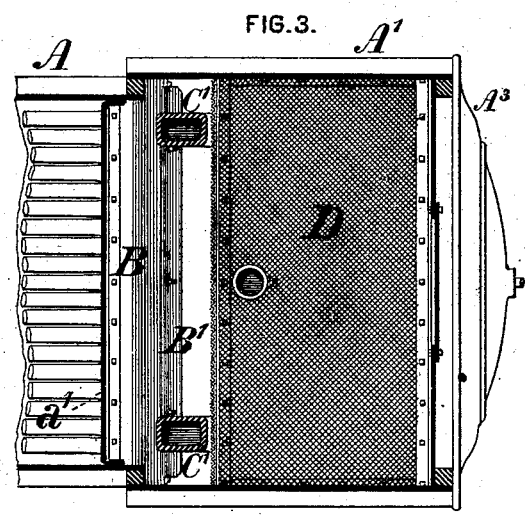
WITNESSES
Geo. B. Collier
Geo. T. Kelly
INVENTOR
Rufus Hill
by Collier & Bell,
Attys.

UNITED STATES PATENT OFFICE.

RUFUS HILL, OF CAMDEN, NEW JERSEY.

SPARK-ARRESTER.

SPECIFICATION forming part of Letters Patent No. 260,753, dated July 11, 1882.

Application filed April 3, 1882. (No model.)

*To all whom it may concern:*

Be it known that I, RUFUS HILL, of the city and county of Camden, in the State of New Jersey, have invented certain new and useful Improvements in Spark-Arresters, of which improvements the following is a specification.

My invention is an improvement upon that for which Letters Patent of the United States numbered 152,375 were granted and issued to myself and Andrew K. Hay, as my assignee, under date of June 23, 1874, and reissued January 4, 1881, No. 9,524.

The objects of my present invention are to effect a more thorough equalization of the draft throughout the series of tubes, and to provide in a smoke-box of ordinary dimensions a netting which may be conveniently located, readily attached and removed, and which will present ample area for the separation of the gaseous and solid products passing into the smoke-box from the tubes.

To these ends my improvements consist in a deflector secured at top to the flue-head and at the sides to the smoke-box, and inclined outwardly and downwardly from the flue-head, so as to present a discharge-space of gradually-increasing transverse area for the products of combustion; also, in a screen or netting extending horizontally from the forward end of the smoke-box to or near the rear of the exhaust-nozzle, and thence inclined upwardly to the periphery of the smoke-box.

The improvements claimed are hereinafter more fully set forth.

In the accompanying drawings, Figure 1 is a vertical longitudinal central section through the smoke-box and portion of the waist of a locomotive-boiler embodying my improvements; Fig. 2, a vertical transverse section at the center of the exhaust-pipe and stack, and Fig. 3 a horizontal section taken above the exhaust-nozzle.

My improvements are shown as applied to a locomotive-boiler of the ordinary construction, the waist A being fitted with a series of fire-tubes, $a$, extending from the flue-head $a'$ to the fire-box or combustion-chamber, and the smoke-box A' being connected by a ring to the waist, and closed at its forward end by a front, $A^3$, provided with a suitable door. The dry-pipe C, by which steam is taken from the dome, passes through the flue-head, and is connected in front thereof to the steam-pipes $C'$, leading to the cylinders. A long exhaust-pipe, $C^2$, is employed, its nozzle $c$ being located at or about the level of the upper row of tubes, and, as in my reissued patent before referred to, a draft or lift pipe is dispensed with, and the function thereof performed by a deflector or "check-plate," B. In lieu, however, of placing the deflector in a vertical position, as shown in my said patent, and thereby forming a discharge-space of substantially uniform horizontal section throughout, the deflector B is, under my present invention, secured to the flue-head above the upper row of tubes, and, after projecting outwardly therefrom for such distance as to afford a space between the flue-head and its adjacent side sufficient for the free discharge of the products of combustion from the upper row of tubes, is thence inclined downwardly and outwardly from the flue-head to its lower edge, thereby affording a uniformly-increasing area of horizontal section in the discharge-space formed between it and the flue-head in correspondence with the increasing areas of tube-section presented by the several lower rows of tubes in front of which it is located. The deflector is connected at its sides to the smoke-box, so as to make tight joints therewith; and I have found in practice that by the above construction the beneficial results of equalization of the draft and downward projection of escaping sparks, cinders, and particles of unburned fuel are accomplished more perfectly and with less interference with the draft than by the employment of a deflector which does not provide a graduation of the discharge-space. To admit of variation of the opening beneath the deflector, as may be required by differences in the duty or steaming qualities of engines or the description of fuel employed, I attach an adjustable section, B', to the lower side of the deflector, which section may be raised or lowered, as desired, and secured in adjusted position by bolts passing through slotted holes.

In the frequent instances in which straight open stacks are employed it becomes necessary to locate a screen or netting of some description in the smoke-box, for the purpose of separating the smoke and gases from the solid matters which pass out of the front ends of the tubes, and retaining the latter while permitting the former to escape freely. Sundry devices for the purpose have been proposed and essayed with varying degrees of success in practice, the majority being objectionable in the particulars of being either insufficient in discharge-area or, on the other hand, involving an abnormal increase of the volume of the smoke-box, as well as being more or less complicated in construction and difficult of attachment and repair. To obviate these objections I provide a screen, D, formed of a sheet or sheets of wire-netting, extending horizontally across the smoke-box, from a point adjacent to the front end thereof to or slightly in rear of the exhaust-nozzle $c$, from which point it is inclined upwardly between the steam-pipes C' and the lower opening of the stack $A^2$ to the periphery of the smoke-box, being secured thereto by angle-irons or other suitable connections along its horizontal and inclined portions. The front end of the screen D is secured to the lower side of a plate, D', which closes the segmental opening above the front of the screen, and is provided with a removable bonnet, $d$, by which access may be had to the exhaust-nozzle and the space above the netting. Cinders and unburned fuel which collect in the smoke-box may be blown out from time to time by a jet of steam led into the discharge-chamber E; or they may be returned to the fire-box by the devices specified for that purpose in my reissued patent aforesaid, or by other suitable means, as preferred.

While I consider the screen above set forth as desirable in connection with my improved deflector, I do not wish to be understood as limiting the employment of the latter to combination with this or any other specific form of screen, as it may, if desired, be used with a proper spark-arresting stack, and will satisfactorily perform its functions therewith.

I am aware that diaphragms or dampers fixed or hinged in an inclined position in front of a flue-head, and presenting open spaces both at their sides and bottoms, have been heretofore known, and such, therefore, I do not claim.

I claim as my invention and desire to secure by Letters Patent—

1. A deflector or check-plate secured at its top to the flue-head of a tubular boiler and at its sides to the smoke-box, and inclined downwardly and outwardly from the flue-head, so as to present a discharge-space for the products of combustion, which is closed at its sides and is of gradually-increased transverse section, substantially as set forth.

2. The combination, with a locomotive smoke-box, of a screen or netting extending horizontally from the forward portion of the smoke-box to or near the exhaust-nozzle, and thence inclined upwardly to the periphery of the smoke-box between the steam-pipes and the opening of the stack, substantially as set forth.

3. The combination, with a screen or netting, as described, of a front plate and removable bonnet, substantially as set forth.

4. The combination, in a locomotive-boiler, of a flue-head, a deflector forming, with said flue-head, a discharge-space of gradually-increasing transverse area, and a screen or netting extending horizontally from the forward portion of the smoke-box to or near the exhaust-nozzle, and thence inclined upwardly to the periphery of the smoke-box, substantially as set forth.

RUFUS HILL.

Witnesses:
J. SNOWDEN BELL,
GEO. T. KELLY.